J. W. Briggs,

Buckle.

No. 18,790.  Patented Dec. 1, 1857.

UNITED STATES PATENT OFFICE.

JOSEPH W. BRIGGS, OF CLEVELAND, OHIO, ASSIGNOR TO JUDSON A. LAZEL, OF PLAINSVILLE, OHIO.

DEVICE FOR FASTENING HARNESS-TRACES.

Specification of Letters Patent No. 18,790, dated December 1, 1857.

*To all whom it may concern:*

Be it known that I, JOSEPH W. BRIGGS, of Cleveland, in the county of Cuyahoga and State of Ohio, have invented a new and Improved Mode of Fastening Harness-Traces; and I do hereby declare that the following is a full and exact description thereof, reference being had to the accompanying drawings, in which—

Figure 1:
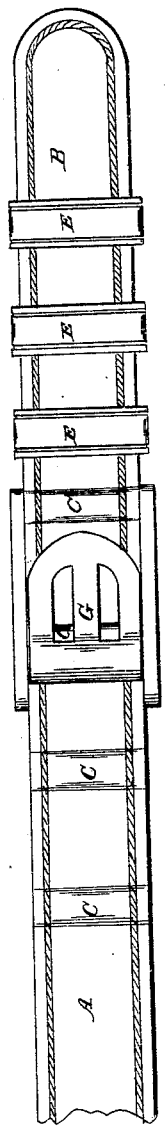
Figure 2:
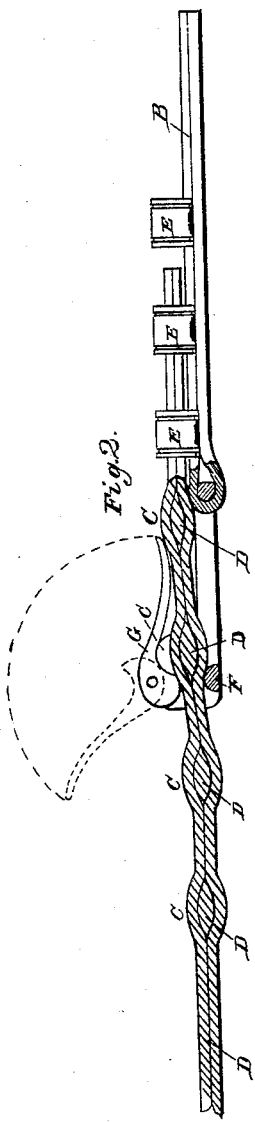
Figure 3:
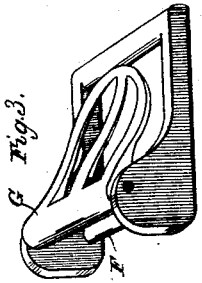

Figure 1 represents a portion of harness trace with my improvement attached; Fig. 2 a vertical section of same; and Fig. 3 a perspective view of the fastening implement, the letters of reference thereon indicating similar parts in all the figures.

The principal features of my invention consist in constructing a trace that may be applied to general use without inserting holes in it for a buckle tongue, as this does greatly diminish the strength of the leather in the trace. This has been a great desideratum with harness makers and others, and to accomplish this object different modes have been tried. Cam levers with corrugations in the bed plate of the apparatus have been used to secure a trace, but this does not answer the desired purpose, the leather being of a flexible nature, the pressure applied to the trace by the cam lever causes the trace to become thin, hard, and brittle at the point where the pressure is applied, by this means the trace will slip in the apparatus, and if the cam-lever holds the leather so firm as to prevent its sliping out, the cam on the lever will cast the trace off by a constant side pressure, which is applied by the force of the animal while in the act of drawing; but my improved mode of securing the trace preserves the strength of the leather and furnishes a mode of expeditiously and securely fastening the harness trace at any desired point, which I accomplish by a combination of two contrivances: first, by forming a series of elevations, or thicknesses, on the forward part of the trace; and second, by the employment of a stationary bar and vibrating cam-lever contained in a frame attached to the hame-tug.

To enable others to make and use my invention, I will proceed to describe its construction and operation.

A, Fig. 1, is a position of a harness trace. C C C C are elevated or raised parts, made by the insertion of double wedge-shaped pieces (D Fig. 2) inserted between the layers of the material when stitching them together.

B is the hame-tug provided with the usual loops E. Attached to the said hame-tug is the fastening apparatus (Fig. 3), which consists of a frame of the form indicated in the drawing.

F is a bar across its underside; and G a cam-lever placed above it, and supported, so as to move back and forth, in the sides of said frame. The cam of the said lever is so constructed that it shall tend to draw the lever tighter on the trace when it comes in contact with the raised parts thereof, as shown in the drawing Fig. 2.

The operation is as follows: The cam-lever is thrown back to enlarge the opening between it and the bar, the trace is then inserted, and, when adjusted to the desired location, is then turned down, thus decreasing the size of the opening and preventing the passing of the trace when the cam comes in contact with its raised parts, and, as is evident, holding the trace firmly and securely in the position in which it may be placed.

I do not claim as my invention the eccentric which presses the trace against cavities in the bed plate, neither do I lay any claim to a cam-lever in any way. But What I do claim as my improvement and desire to secure by Letters Patent is—

The raised or elevated parts of the trace, C C C C, when used in combination with a cam-lever as herein set forth.

JOSEPH W. BRIGGS.

Witnesses:
   JUDSON A. LAYELL,
   S. B. BRIGGS.